United States Patent [19]
Kleinschmidt et al.

[11] Patent Number: 6,085,112
[45] Date of Patent: Jul. 4, 2000

[54] COMMUNICATION DEVICE

[75] Inventors: Peter Kleinschmidt, Munich; Gerhard Niedermair, Vierkirchen, both of Germany

[73] Assignee: Siemens Aktiengesellschaft, Munich, Germany

[21] Appl. No.: 08/945,773

[22] PCT Filed: May 2, 1996

[86] PCT No.: PCT/DE96/00758

§ 371 Date: Oct. 30, 1997

§ 102(e) Date: Oct. 30, 1997

[87] PCT Pub. No.: WO96/35288

PCT Pub. Date: Nov. 7, 1996

[30] Foreign Application Priority Data

May 3, 1995 [DE] Germany ............................ 195 16 211
Aug. 2, 1995 [DE] Germany ............................ 195 28 424

[51] Int. Cl.[7] ....................................................... H04B 1/38
[52] U.S. Cl. ............................ 455/556; 455/566; 455/575
[58] Field of Search ................................... 455/422, 517, 455/550, 556, 557, 566, 575, 90, FOR 121

[56] References Cited

U.S. PATENT DOCUMENTS

| | | |
|---|---|---|
| 4,109,145 | 8/1978 | Graf . |
| 4,836,670 | 6/1989 | Hutchinson . |
| 5,189,632 | 2/1993 | Paajanen et al. ........................ 455/556 |
| 5,335,276 | 8/1994 | Thompson et al. . |
| 5,625,673 | 4/1997 | Grewe et al. ........................... 455/556 |

FOREIGN PATENT DOCUMENTS

| | | |
|---|---|---|
| 0 352 914 | 1/1990 | European Pat. Off. . |
| 0 472 361 A2 | 2/1992 | European Pat. Off. . |
| 0 526 802 A2 | 2/1993 | European Pat. Off. . |
| 0 539 699 A2 | 5/1993 | European Pat. Off. . |
| 0 624 038 A1 | 11/1994 | European Pat. Off. . |
| 0 626 773 A1 | 11/1994 | European Pat. Off. . |
| 0 645 932 A1 | 3/1995 | European Pat. Off. . |
| WO 93/16550 | 8/1993 | WIPO . |
| WO 94/01958 | 1/1994 | WIPO . |

OTHER PUBLICATIONS

Patent Abstracts of Japan, E–1595, Aug. 24, 1994, vol. 18, No. 455, Hitachi Ltd., K. Umezawa, Portable Video Telephone Set, JP 06–141308 May 20, 1994, 1 page.

Patent Abstracts of Japan, Mar. 31, 1993, Matsushit Electric Ind Co Ltd., K. Shinichi, Portable Radio Type TV Telephone, JP 06–292195, Oct. 18, 1994, 1 page.

Patent Abstracts of Japan, Oct. 14, 1993, Nippon Telegraph & Telephone Corp., S. Hisami et al, Small–Sized Information Input Terminal & Video Telephone Set, JP 07–111640, Apr. 25, 1995, 1 page.

IBM Technical Disclosure Bulletin, vol. 37, No. 06A, Jun. 1994, Personal Communicator Configurations, pp. 449–453.

Magazine, Elektronik vol. 25 (1990), Michael Grillo, Computer Freihändig Bedienen, pp. 42–45.

Telenorma Nachrichten (1993), Heft 97/N, Dr. Thomas Kummerow, Möglichkeiten der Multimediakommunikation, pp. 3–10.

Optoelectronics (1990), Lawrence Curran, A Small Big Picture, pp. 41–42.

Radio Fernsehen Elektronik (1990), Das Personal–Display Private Eye, pp. 642–643.

*Primary Examiner*—Thanh Cong Le
*Attorney, Agent, or Firm*—Hill & Simpson

[57] ABSTRACT

A wide variety of components, such as speech input and output devices, image display devices and a computer are combined in one device. A plurality of methods of representing images are indicated. Preferably, the computer can be removed from the device and communicate with the basic device using an infrared link. In addition, a broadband transmission link may be provided, radio waves which are independent of the telephone network making contact with computer servers which are preferably provided.

12 Claims, 4 Drawing Sheets

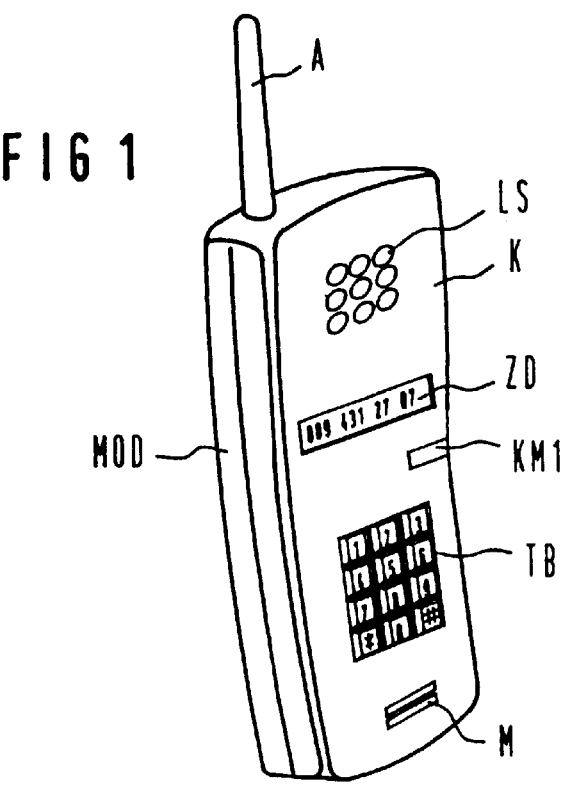
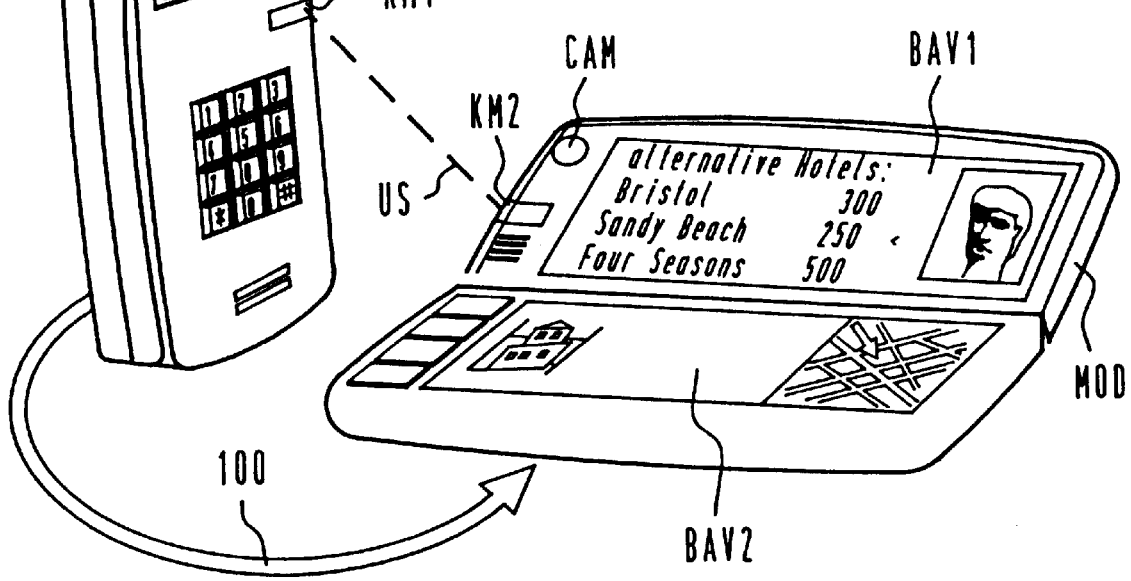

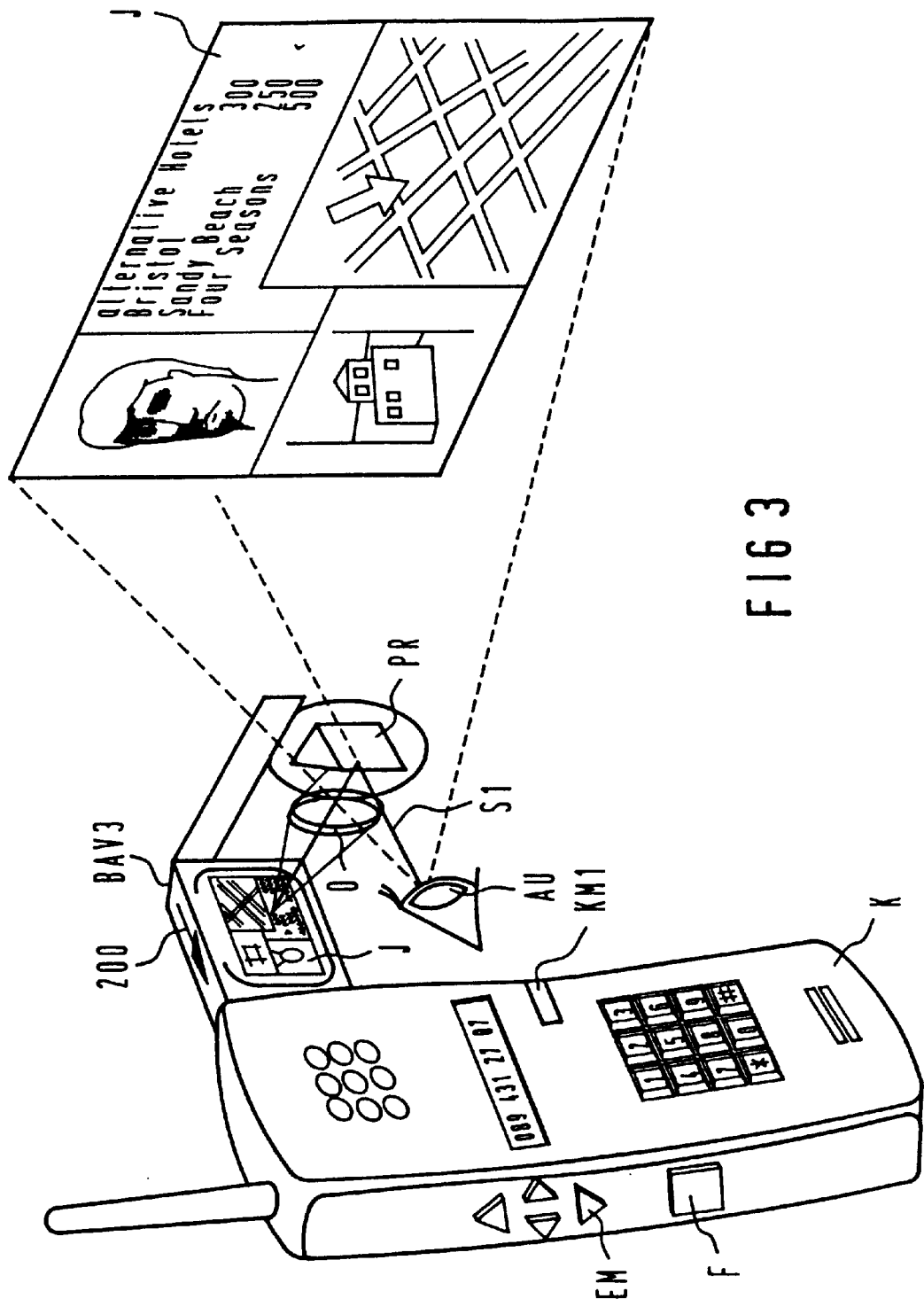

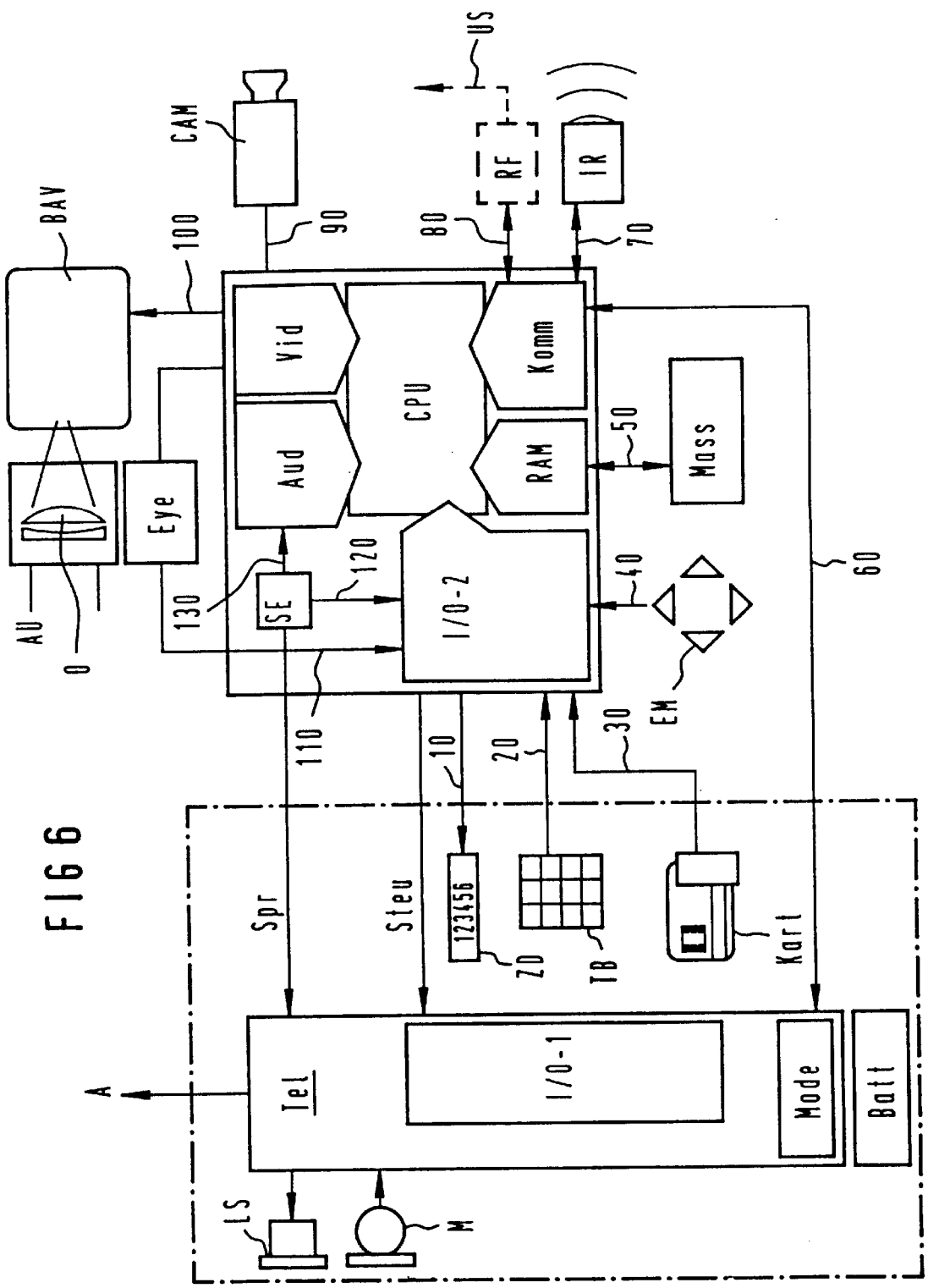

COMMUNICATION DEVICE

BACKGROUND OF THE INVENTION

Global economic and cultural cooperation is increasing all the time. A result of this is that communication means are increasingly becoming a focus of economic and industrial interest. The occasions when it is necessary to obtain rapid access to personal or economic data and to base decisions directly on it are becoming more and more frequent.

The possibility of visual communication is also particularly important in this respect. To a certain extent, these possibilities are already provided by video telephones and fax devices. However, these technical solutions do not allow for the greater mobility which is required and demanded by people today.

The increasing use of electronic media and electronic data processing in all types of scientific and economic activities will cause the data volume with which such devices have to cope to continue to rise.

SUMMARY OF THE INVENTION

The object on which the invention is based is to provide a highly integrated mobile communication device and a communication arrangement.

In general terms the present invention is a communication device with integrated radio telephone. It has an image display device and an image recording device. An input means permits the position of a mark on an image of the image display device to be changed. A computer evaluates at least the position of the mark in conjunction with the image on the image display. In addition to the transmitter and receiver of the radio telephone, separate transmission means is provided for transmitting data independently of the radio telephone. The means being used at least to transmit data rates which exceed the transmission capacity of the radio telephone transmission link.

Advantageous developments of the present invention are as follows.

Means for tracking the pupil of the viewer of the image display device are provided. The computer evaluates the viewing direction of a viewer in conjunction with the image.

The computer is designed as a personal computer.

The image display device is integrated in the housing of the radio telephone. The image display device has a fold-open optical deflection device which deflects the optical beam path to the eye of the viewer when he is making a call with the radio telephone.

The image display device has a lens which represents the image into infinity and a reflection device which has a semi-translucent mirror or a prism.

The computer and the image display device are designed as a separate unit which can be removed from the housing of the radio telephone. A transmission means provides for communication between the separate units.

The input means have direction arrow keys, a trackball or a touch pad.

The transmission means are designed as an infrared link and/or an ultrasonic link and/or a radio transmission link.

The device has means for converting text into speech and/or vice versa.

The present invention is also a communication arrangement comprising at least a first communication device and a second communication device.

The data transmission takes place independently of the radio telephone via at least one data channel.

The data transmission takes place via a communication server which can be accessed by radio or infrared. The communication takes place via the server, which also performs computational tasks which are transmitted to it by the computer.

A particular advantage of the communication device according to the invention consists in the fact that it provides the possibility of carrying out visual communication and at the same time carrying out manipulations with the displayed screen contents using input means.

The communication device according to the invention advantageously has an optical image recording device with which images and/or the person speaking can be recorded.

It is particularly advantageous that the communication device according to the invention has a separate data channel with which relatively high data capacities can be transmitted. This data channel can, for example, be optimized directly for the transmission of image data and addressed using separate transmission means.

In the communication device according to the invention, there may be advantageous provision of means with which a pupil of the viewer who is using the device can be tracked, so that it is possible to conclude directly which screen contents are currently of interest to the user of the device and the viewing direction can be used as an input means in conjunction with the computer which is provided in the device.

The computer in the communication device according to the invention can advantageously have a personal-computer functionality, so that universally available software programs can be used and it is not necessary to carry two kinds of devices. Furthermore, the processor which is provided in the device can be used doubly.

The image display device of the communication device according to the invention is particularly advantageously integrated directly in the radio telephone and the view of the viewer is deflected on to the screen by means of a suitable fold-open optical system. In this way, a compact device is available whose components are continuously connected to one another and which can be used easily by folding open.

The view of the viewer is advantageously deflected here using a prism or semi-translucent mirror and is directed through a lens in order to enlarge the image to be viewed. The deflection means here may also advantageously be semi-translucent, so that the viewer can simultaneously view the image shown by the image output device and the surroundings.

The communication device according to the invention can advantageously be designed in such a way that the computer and the image display device are integrated in a slide-in compartment and can be removed during operation, the communication with the radio telephone being brought about by means of a separate transmission link. In this way, relatively complex applications can be carried out and relatively large images can be shown.

Compact input means, such as are known from the use of mobile PCs, are advantageously integrated in the communication device according to the invention.

The device advantageously has as transmission means infrared means, ultrasonic means or radio transmission means, which can already be implemented in a cost-effective manner.

A communication arrangement comprising a plurality of such communication devices can advantageously be implemented, the communicating parties being able to exchange data and speech with one another.

In a communication arrangement with the communication device according to the invention, speech and data are particularly advantageously transmitted either via the radio network or via a separate broadband data network. Advantageously, specific communication servers, which can be accessed by means of the separate broadband data channel, are provided for the purpose of data transmission. For example, said communication servers are provided only locally, but, in specific cases, they can perform for the computer of the device complex computational tasks which have been exported from it.

A particular advantage of the communication device according to the invention consists in the fact that it has a fold-open mini screen, because, firstly, said screen cannot be lost and, secondly, it can serve as a cover to protect the device.

The communication device according to the invention particularly advantageously has a concave mirror for imaging the mini screen, since this enables a lens to be dispensed with.

In the communication device according to the invention there is advantageously provision for laterally inverted or vertically inverted representations to be corrected by using optical or electronic means.

The communication device according to the invention advantageously has a memory in which data can be stored, so that satisfactory operation is made possible with the device even off-line.

The communication device according to the invention advantageously has a write and read device, since this permits access authorizations to be easily checked.

With the communication device according to the invention, a data carrier can also advantageously be written to or read, since this provides an economic data storage alternative with which database contents or person-specific data can be read in and/or read out.

The communication device according to the invention particularly advantageously has speech input or output means, since this permits commands to be issued to the device without using hands and/or permits messages from the device to be perceived without the eyes.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows an example of a communication device according to the invention.

FIG. 2 shows a communication device according to the invention with the computer and display component removed.

FIG. 3 shows an example of a communication device according to the invention with integrated optical system and input means.

FIG. 6 shows an example of a block circuit diagram of the electronic component present in the communication device according to the invention.

DESCRIPTION OF THE PREFERRED EMBODIMENTS

Figure 4:
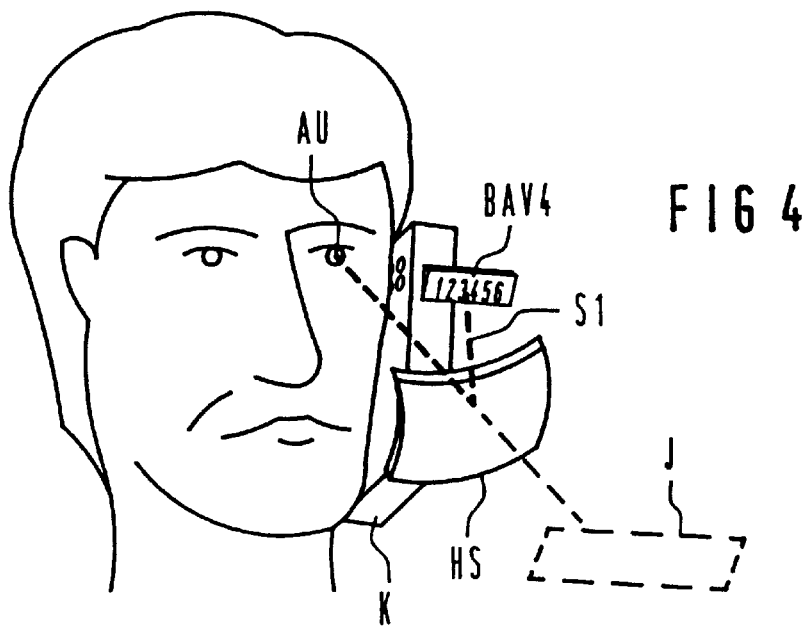
FIG. 4 shows an embodiment of an image display device.

FIG. 1 shows a communication device K according to the invention, which is essentially equivalent to a radio telephone. It has an antenna A, a loudspeaker LS and a microphone M. A keypad area TB is provided for dialling numbers. Selected telephone numbers are shown by means of a numerical display ZD. In this exemplary embodiment of the communication device according to the invention, the computer and the image display device are installed, for example, in a module MOD which can be removed from the radio telephone. A connection between the computer and the communication device K is then made via a communication means KM1. This communication means can be, for example, an infrared link or a radio link. For more narrowband applications, an ultrasonic connection is also suitable for this. This applies in particular if only two basic devices MOD and K communicate via the connection.

The communication means KM1 can also, for example, be used to bring about a local data transmission connection at a higher data transmission rate than would be possible for a radio telephone network. To this end, network accesses, which can be used to set up a data transmission connection, are provided for example at specific localities, for example even in enclosed spaces. For example, these networks can contain servers which also make available to the communication device K a computational capacity in order to relieve the computer integrated in the device, here in the module MOD.

For rapid communication over relatively large distances, telephone and fax devices are already available to everyone. Relatively recent developments in this field are the video telephone and communication applications based on networked computers which make it possible to exchange moving images and multimedia documents and to process them together. The cellular mobile phone supported by satellites is developing into an attractive means of providing universal accessibility to a person throughout the world. When a person cannot be accessed, telephone answering machines and mail and phone mail systems are used. For the future, "intelligent PBXs" are under discussion, and these will be able to divert calls and faxes, for example to other devices, in accordance with a user profile, or even convert text and speech and read it out or write down spoken calls and output them to an image display device as fax or text. To protect the individual against being bothered by undesired information, an automatic device may be provided in the network (telephone exchanges, servers, PBXs) or installed at the end customer (telephone answering machine or mail service) which diverts calls to other terminals or keeps them ready for later evaluation.

For each problem there is a dedicated solution which independently fulfills the respectively desired objective. However, the overall technical diversity proves too counterproductive in order to be able to provide the user with a clear, effective expansion throughout the world of his ability to operate. The significant factors with the communication device according to the invention are for example the additional functions of data display, image display and video display and a camera for video telephone and video conferencing. The basic advantage for the benefit of these solutions is that the radio telephone-mobile phone, is in any case accepted owing to the main quality (making telephone calls). Universal accessibility worldwide with one number (for example private telephone exchange in the mobile phone and silent diversion of the call or fax to other devices) can thus be ensured. The conversion of speech and text (fax display or screen display) or of text to speech (reading out by machine of mail and fax) and automatic translation of foreign languages are thus within the scope of a communication device according to the invention.

FIG. 2 shows an example of a communication device according to the invention in which the computer can be removed as a module MOD in conjunction with image display devices BAV1 and BAC2. The removability from the basic unit is represented by an arrow 100 on the radio telephone. In the removed state, the module MOD maintains the connection to the basic unit via a transmission link US. Communication means KM1 and KM2 are provided for this purpose. For example, an image recording device CAM is integrated in the removed module. For example, database contents, communicating parties with which communication is taking place or other information, for example fax messages, may be displayed on the image display device BAV1 and BAV2. The input means according to the invention may be provided, for example, on the device K or on the module MOD. For example, a selection from the displayed screen contents may be made using the input means. Here, for example a hotel booking may be made by selecting one of the displayed hotels. However, bank transactions or other visual, textual communication transactions are also conceivable.

In the folded-open display component MOD, there is provision, for example, of a battery and an electronic system (processor, memory, operating software and application software, infrared link or radio link to the mobile phone and, if appropriate, to a broadband network installed in space, direction control keys and, if appropriate, a pen with which it is possible to write, draw and, primarily, navigate interactively on the screen, a CCD camera and, if appropriate, also a microphone and loudspeaker). For example, while a call is being made, data, texts, images, films of the communicating party may be displayed, the user's own data may be searched and displayed (for example addresses, appointments, articles etc.). Navigation can be performed on the display BAV1 and BAV2 with the input means according to the invention. Thanks to the built-in camera, the person speaking can be viewed at the subscriber's device, and the camera can also be used to photograph objects, both for oneself, for later further processing, or for direct transmission to the communicating party or parties.

FIG. 3 shows a further exemplary embodiment of a communication device K according to the invention. In all the figures discussed, also FIGS. 1 and 2, all the designations have been made identical and, since the device is illustrated in the same form, only the essential components are designated in order to maintain clarity.

In this variant of the communication device according to the invention, the image display device BAV3 is, for example, integrated in the device itself. Here, for example the input means EM and F are attached to one side of the housing of the communication device K according to the invention. For example, direction arrow keys are provided in conjunction with a firing key F, with which a selection is confirmed. However, it is also readily possible to provide other means which are known to the person skilled in the art, for example a trackball, touch pad, or possibly, a mini joystick.

For example, in this exemplary variant here an image reproduction device BAV3 (private eye) is provided, for example in the form of an illuminated liquid crystal display, in the region of the earphone. The image is mixed, for example by means of a reflection device, with the scene normally perceived by the eye AU. A reflection device comprises, for example, an ocular O which projects the screen into infinity and a beam splitter (partially translucent 45° mirror or semi-translucent prism PR; a prism with a semi-translucent mirror which has been vapor deposited on the hypotenuse is shown). When not in use, is the optical system represented is advantageously folded shut and entirely or partially retracted into the mobile phone with the image reproduction device. This is indicated here by an arrow 200. The beam path, which starts from the eye of the viewer AU, is represented here by means of a beam S1 by way of example for the sake of clarity. On the one hand, the information I is represented on the image display device BAV3 and, on the other hand, I is represented in enlarged form, as the viewer sees it. Advantageously, an eye tracker can also be mounted in the private eye on the communication device according to the invention. The eye tracker tracks the position of the pupil of the eye, for example with a small camera integrated in the BAV3, and detects the viewing direction of the viewer. An electronic system (processor, memory, operating software and application software), infrared connection or radio connection KM1 to a broadband network installed in space are provided here in the mobile phone according to the invention. The connection to the broadband network provides two advantages. The mobile phone can use broadband services, such as video telephone, and request, display and transmit extensive amounts of data at a high speed. Secondly, computation-intensive tasks can be stored on fixed servers without faults and pauses. The particular advantage of this solution consists in the fact that it can be used with one hand, is easy to handle and cannot be lost.

An advantageous refinement of an image display device for the communication device according to the invention is illustrated in FIG. 4. The image to be displayed is represented, for example, by means of an image display device BAV4. This image display device can usually be a mini matrix display which can advantageously also be arranged in an identical way to the numerical display ZD provided in FIG. 1. Furthermore, the optical beam path S1 is illustrated which is directed from the display BAV4 via a concave mirror HS to the eye of the viewer AU. The image which is represented on the image display device BAV4 is displayed in enlarged form in a virtual image I by means of the concave mirror HS. The concave mirror HS is attached, for example, to the communication device K and it can advantageously be folded shut by suitable devices or retracted into the communication device.

For example, it is possible to provide servo-mechanisms (not illustrated) which automatically move the display device and the concave mirror into the correct position when the telephone is operating. Furthermore, the lateral inversion and the vertically inverted representation which are produced as a result of viewing a reflected image can be corrected by means of electronic components, or other components. The additional video display which is moved into the field of vision with a viewer arrangement may be identical to the telephone display which is usually present. It needs to be mounted on the communication device in a way which is favorable for viewing and requires adequate resolution and suitable optical imaging in the eye of the viewer AW using lenses, mirrors and/or prisms. Laterally inverted and/or vertically inverted images can be transformed optically or electronically into the accustomed normal position. As FIG. 4 shows, a concave mirror, which may also be partially translucent, brings about a beam deflection, enlargement of the image and transposition of the image location I to a greater distance.

Figure 5:
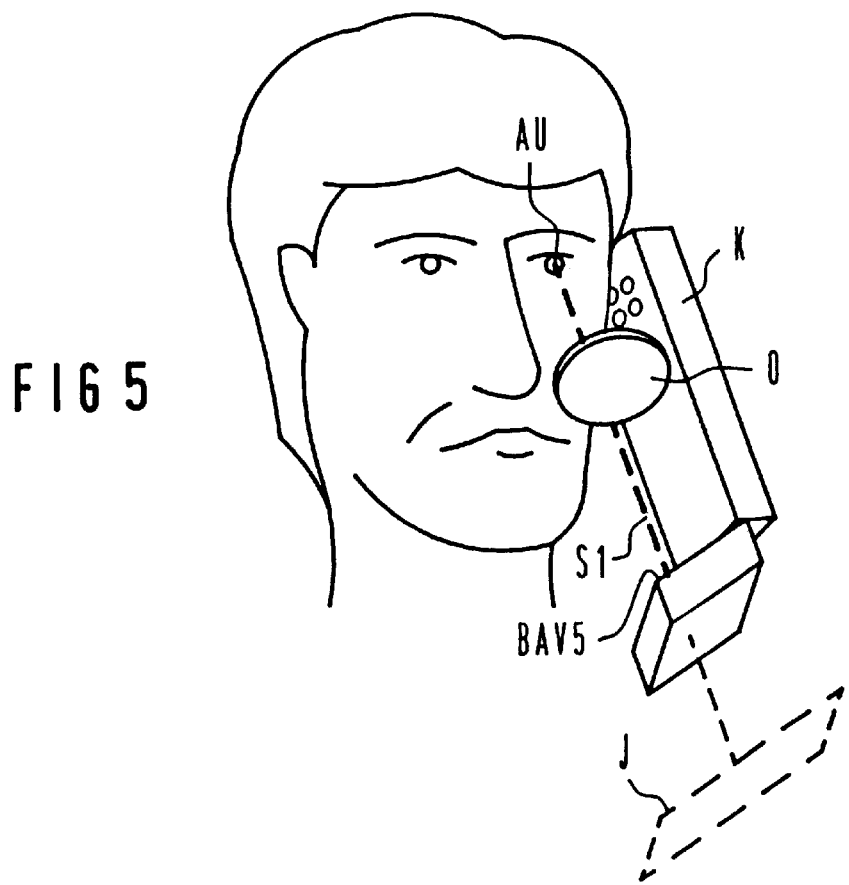
FIG. 5 shows an embodiment of an image display device.

FIG. 5 shows an advantageous refinement of an image display device for the communication device according to the invention. FIG. 5 illustrates the communication device K which contains an integrated image display device BAV5.

This image display device consists for example in a mini matrix display which is provided, in a folding-shut or sliding-in form, on the housing K of the communication device. The foldable image display device can preferably be used to cover sensitive parts of the device. The beam path of a viewer S1 who is making a call is deflected from the eye AU to the image display device BAV5 by an optical system, preferably a magnification lens O. This produces a magnified, virtual image. For the cost-effective manufacture of this optical display device, it does not need to be so perfectly implemented. In simple cases, a customary liquid crystal display, which if appropriate is not even illuminated, may even be sufficient, said liquid crystal display being mounted in the viewing angle of the person making the call, for example on a folding-out part on the base of the mobile phone and it being possible for it to be magnified by means of a magnifying glass and viewed at a comfortable visual distance. For example, in this embodiment of the image display device the semi-translucence of the display image is dispensed with. In a degraded embodiment, for example, the overall length of the communication device K, or the folding-open component may be dimensioned in such a way that a magnifying glass can be dispensed with entirely. There may also be provision here to mount a camera to record an image or make a film of the user. The person skilled in the art of the optics used for representation could conceive many variants with mirrors, prisms, lenses and/or concave mirrors which achieve the same effect as the illustrated embodiment, but are more flexible in the selection of the location for the display and have a relatively small overall length of the communication device yet permit greater magnifications using the viewer optical system. Recently, displays which are suitable for the representations have become known, said displays comprising micromechanical displays which have an edge-to-edge length of approximately 2 cm with a resolution of 2048×1152 color pixels. For example, these displays comprise tilting mirrors which are etched micromechanically from silicon and are driven electrostatically. These displays, which operate in the reflection mode, are illuminated by a small light source and are particularly economical in terms of current, that is to say are particularly suitable for application in the communication device according to the invention.

FIG. 6 shows the example of a block circuit diagram for the electronic components of a communication device according to the invention. Preferably, the telephone component of the communication device according to the invention comprises a telephone circuit Tel, which is coupled to a loudspeaker LS and a microphone M. Furthermore, this telephone has an input and output circuit I/O-1 for controlling the rest of the components of the communication device according to the invention. Preferably, a modem Mode for exchanging data by radio is integrated in the telephone Tel. Furthermore, the device has an accumulator Batt. Furthermore, a numerical display D and a keypad TB are provided. Preferably, the device also has a data reading and/or writing device Kart. Furthermore the device has further circuits, for example in a component which can be removed separately as a module, as illustrated in FIG. 2. Here, for example an output unit I/O-2 is provided, which communicates with the input means EM via a data line 40. For example, a processor CPU, which has a memory RAM and communication means Komm is provided as a central component. Furthermore, speech input and/or output as well as image input and/or output means Aud and Vid are provided. The image processing means Vid communicate, for example via a line 90, with a camera CAM. The communication means Komm have, for example, data connections to narrowband and broadband transmitters IR and RF, the narrowband transmitter being controlled via the line 70 and the broadband transmitter being controlled via the line 80. The broadband transmitter RF can control, for example, the transmission link US which is illustrated in FIG. 2.

Furthermore, FIG. 6 shows that a permanent memory Mass may be provided. It is supplied with data from, for example, the volatile memory RAM via a data line 50. The modem Mode which is present in the telephone Tel can communicate with the communication device Komm, for example for a data line 60. Furthermore, the device has an image display device BAV (illustrated schematically). This image display device is supplied from the image processing unit Vid by means of a data line 100. Furthermore, an eye tracking device of the viewer's eye Au is illustrated here and is designated by Eye. This eye tracking device is supplied with data by the image processing unit Vid by means of a data line 110, and vice versa. The viewer's eye Au is viewed for example by means of an optical system O and the eye tracking device Eye passes on its data to the input/output unit I/O-2 via the data line 110. A voice input and/or voice output unit SE is preferably also provided in the communication device according to the invention. Said unit SE communicates for example with the telephone circuit Tel via a line Spr. For example, data to be input and output or for other telephone functions can be transmitted from the processor to the telephone circuit via a control line Steu. Furthermore, data lines 10 to 30 are provided which provide the input and output unit I/O-2 with the data of the numerical display ZD of the keypad TB and of the read/write device Kart.

In FIG. 6, preferably all the components which are important for the invention are named and placed in functional relationship with one another. Preferably, the telephone can communicate via the antenna A by means of GSM or satellite transmission/reception technology or other known radio-controlled telephone connection possibilities. The display ZD displays, for example, call numbers, names or operating states. In addition, a numerical keypad TB is provided, via which call numbers can be entered. The read and/or write device Kart is preferably configured for chip cards or magnetic strips. This enables, for example, the access authorization of the telephone network, the high-frequency and low-frequency telecommunications technology for transmitting, receiving, modulating, demodulating and coding and decoding speech as well as circuit components with to be controlled the function of the input and output controller I/O-1. The input and output controller I/O-2 ensures, for example, that the various signals, those from the keypad TB, the display ZD, the card reader Kart etc., are processed properly. The modem mode can be used for example to transmit data from computers, for example from the integrated computer CPU, to other computers. The speech recognition circuit SE is used, for example, to recognize spoken numbers and convert them into numerical processes. The mass storage means Mass comprises, for example, a write/read memory in the form of a hard disk and/or as flash RAMs or battery-buffered RAMs. The communication interface Komm is used preferably to connect further modems, as well as audio and video interfaces, and to convert analog speech signals and music signals and video streams coming from the camera into digital values which can be processed by processor, and to produce acoustic signals and video images from the digital values which can be processed by processor. Navigators in the form of input means EM, for example directional keys, sliding and rotary controllers, rolling balls, mice, joysticks, touch pads and eye trackers, are provided for navigation. The data streams which are output are preferably coordinated by the input and output controller I/O-2. Preferably, the speech unit SE has a speech generator which converts texts into acoustic speech signals. The narrowband interface IR preferably comprises a communications component which is connected to the processor CPU and which makes available the necessary protocols for exchanging data, and an infrared transmitter diode and an infrared receiver diode, as well as the associated drivers and receiver circuits. A high-frequency transmission device RF can be used for broadband transmissions. The image display device BAV comprises, for example, a searcher arrangement in which the eye is not shown a purely optically generated image but instead an electronic image generated by the video camera chip of the camera CAM. For this purpose, the image is generated on a miniaturized cathode ray tube or on a liquid crystal illuminated from behind. In order to obtain a high level of contrast, an active liquid crystal display is preferably used. In order to achieve a relatively high resolution with small dimensions, the active transistors are produced, for example, using polycrystalline silicon. Preferably, the image which is generated is thus magnified by means of an optical system and presented at a comfortable distance from the eye. This optical system is usually a magnifying glass, and the position of the image can preferably be freely selected by means of a dioptric adjustment.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication device having an integrated radio telephone having a transmitter and receiver, comprising:
    an image display device;
    an image recording device;
    at least one input device which permits a position of a mark on an image of the image display device to be changed;
    a computer with which at least the position of the mark is evaluated in conjunction with the image on the image display;
    in addition to the transmitter and receiver in the radio telephone, a separate transmitter for transmitting data independently of the radio telephone, said separate transmitter being used at least to transmit data rates which exceed a transmission capacity of a radio telephone transmission link of the radio telephone.

2. The communication device as claimed in claim 1, wherein the communication device further comprises at least one device for tracking a pupil of a viewer of the image display device, and wherein the computer evaluates a viewing direction of the viewer in conjunction with the image.

3. The communication device as claimed in claim 1, wherein the computer is a personal computer.

4. The communication device as claimed in claim 1, wherein the image display device is integrated in a housing of the radio telephone, said image display device having a fold-open optical deflection device which deflects an optical beam path to the eye of a viewer when the viewer is making a call with the radio telephone.

5. The communication device as claimed in claim 4, wherein the image display device has a lens which represents the image at infinity and a reflection device which has one of a semi-translucent mirror or a prism.

6. The communication device as claimed in claim 1, wherein the computer and the image display device are a separate unit which is removable from a housing of the radio telephone, and wherein the communication device further comprises a further transmitter for communication between the separate unit and the radio telephone.

7. The communication device claimed in claim 1, wherein the input device has at least one of direction arrow keys, a trackball or a touch pad.

8. The communication device claimed in claim 6, wherein the further transmitter is at least one of an infrared link, an ultrasonic link and a radio transmission link.

9. The communication device claimed in claim 1, wherein the communication device further comprises at least one device for converting between text and speech.

10. A communication arrangement comprising:
    at least a first communication device and a second communication device; each of the first and second communication devices having an integrated radio telephone having a transmitter and a receiver;
    each of the first and second communication devices having an image display device;
    each of the first and second communication devices having an image recording device;
    each of the first and second communication devices having at least one input device which permits a position of a mark on an image of the image display device to be changed;
    each of the first and second communication devices having a computer with which at least the position of the mark is evaluated in conjunction with the image on the image display;
    each of the first and second communication devices having, in addition to the transmitter and receiver is the radio telephone, a separate transmitter for transmitting data independently of the radio telephone, said separate transmitter being used at least to transmit data rates which exceed a transmission capacity of a radio telephone transmission link of the radio telephone.

11. The communication arrangement as claimed in claim 10, wherein data transmission takes place independently of the radio telephone via at least one data channel.

12. The communication arrangement as claimed in claim 10, wherein data transmission takes place via a communication server which is accessible by radio or infrared, the communication taking place via a server, which also performs computational tasks which are transmitted to the server by the computer.

* * * * *